(12) United States Patent
Hardin

(10) Patent No.: US 8,843,978 B2
(45) Date of Patent: Sep. 23, 2014

(54) METHOD AND APPARATUS FOR NETWORK BANDWIDTH ALLOCATION

(75) Inventor: Glen Hardin, Charlotte, NC (US)

(73) Assignee: Time Warner Cable Enterprises LLC, New York, NY (US)

(*) Notice: Subject to any disclaimer, the term of this patent is extended or adjusted under 35 U.S.C. 154(b) by 2108 days.

(21) Appl. No.: 10/881,979

(22) Filed: Jun. 29, 2004

(65) Prior Publication Data

US 2005/0289618 A1  Dec. 29, 2005

(51) Int. Cl.
| | |
|---|---|
| H04J 3/16 | (2006.01) |
| H04B 7/212 | (2006.01) |
| H04N 7/173 | (2011.01) |
| H04L 29/06 | (2006.01) |
| H04N 21/262 | (2011.01) |
| H04L 12/801 | (2013.01) |
| H04L 12/927 | (2013.01) |
| H04L 12/911 | (2013.01) |
| H04N 21/472 | (2011.01) |
| H04N 21/2385 | (2011.01) |
| H04L 12/54 | (2013.01) |

(52) U.S. Cl.
CPC .......... *H04L 47/805* (2013.01); *H04L 65/4084* (2013.01); *H04N 21/26216* (2013.01); *H04N 7/17309* (2013.01); *H04L 47/15* (2013.01); *H04L 47/822* (2013.01); *H04L 47/788* (2013.01); *H04N 21/47202* (2013.01); *H04N 21/2385* (2013.01); *H04L 12/5695* (2013.01)
USPC ................... 725/95; 725/96; 725/97; 725/98; 725/118; 370/437; 370/444

(58) Field of Classification Search
USPC .................................................. 725/63–153
See application file for complete search history.

(56) References Cited

U.S. PATENT DOCUMENTS

| | | | |
|---|---|---|---|
| 5,862,312 A | 1/1999 | Mann et al. | |
| 5,878,324 A | 3/1999 | Borth et al. | |
| 5,926,205 A | 7/1999 | Krause et al. | |
| 5,935,206 A * | 8/1999 | Dixon et al. | 709/219 |
| 6,092,178 A | 7/2000 | Jindal et al. | |
| 6,128,316 A | 10/2000 | Takeda et al. | |
| 6,157,377 A * | 12/2000 | Shah-Nazaroff et al. | 715/719 |
| 6,169,728 B1 | 1/2001 | Perreault et al. | |
| 6,211,901 B1 | 4/2001 | Imajima et al. | |
| 6,219,840 B1 * | 4/2001 | Corrigan et al. | 725/117 |
| 6,240,553 B1 | 5/2001 | Son et al. | |
| 6,330,609 B1 * | 12/2001 | Garofalakis et al. | 709/229 |
| 6,353,626 B1 * | 3/2002 | Sunay et al. | 375/130 |
| 6,378,130 B1 * | 4/2002 | Adams | 725/95 |
| 6,434,141 B1 | 8/2002 | Oz et al. | |

(Continued)

OTHER PUBLICATIONS

Motorola DOCSIS Cable Module DCM 2000 specifications, 4 pages, no date.

(Continued)

*Primary Examiner* — Mushfikh Alam
(74) *Attorney, Agent, or Firm* — Gazdzinksi & Associates, PC

(57) ABSTRACT

Methods and apparatus for assigning bandwidth to a network based on two or more different service levels. In an exemplary embodiment, video on-demand (VOD) session requests within a service group of an HFC cable network are assigned bandwidth such that maximum opportunity is given to grant HD VOD request among SD VOD requests, while meeting the goal of minimizing service disruption by spreading the sessions over multiple QAM channels, and limiting the maximum number of active VOD sessions of any kind.

16 Claims, 14 Drawing Sheets

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 37 | 38 | 39 | 40 | 37.5 |
| 33 | 34 | 35 | 36 | 33.75 |
| 29 | 30 | 31 | 32 | 30 |
| 25 | 26 | 27 | 28 | 26.25 |
| 21 | 22 | 23 | 24 | 22.5 |
| 17 | 18 | 19 | 20 | 18.75 |
| 13 | 14 | 15 | 16 | 15 |
| 9 | 10 | 11 | 12 | 11.25 |
| 5 | 6 | 7 | 8 | 7.5 |
| 1 | 2 | 3 | 4 | 3.75 |
| ⌞102 | ⌞104 | ⌞106 | ⌞108 | ⌞110 |

(56) References Cited

U.S. PATENT DOCUMENTS

| | | | |
|---|---|---|---|
| 6,498,783 B1* | 12/2002 | Lin | 370/252 |
| 6,590,865 B1* | 7/2003 | Ibaraki et al. | 370/230 |
| 6,687,735 B1 | 2/2004 | Logston et al. | |
| 6,763,391 B1* | 7/2004 | Ludtke | 709/231 |
| 6,891,841 B2 | 5/2005 | Leatherbury et al. | |
| 6,917,628 B2* | 7/2005 | McKinnin et al. | 370/468 |
| 6,986,156 B1* | 1/2006 | Rodriguez et al. | 725/95 |
| 7,047,309 B2* | 5/2006 | Baumann et al. | 709/232 |
| 7,069,573 B1* | 6/2006 | Brooks et al. | 725/62 |
| 7,086,077 B2* | 8/2006 | Giammaressi | 725/95 |
| 7,930,715 B2* | 4/2011 | Hendricks et al. | 725/35 |
| 2001/0030785 A1 | 10/2001 | Pangrac et al. | |
| 2002/0054589 A1* | 5/2002 | Ethridge et al. | 370/352 |
| 2002/0059619 A1 | 5/2002 | Lebar | |
| 2002/0063621 A1* | 5/2002 | Tseng et al. | 340/2.7 |
| 2003/0002862 A1 | 1/2003 | Rodriguez et al. | |
| 2003/0005453 A1 | 1/2003 | Rodriguez et al. | |
| 2003/0007516 A1 | 1/2003 | Abramov et al. | |
| 2003/0046704 A1* | 3/2003 | Laksono et al. | 725/96 |
| 2003/0061619 A1 | 3/2003 | Giammaressi | |
| 2003/0139980 A1 | 7/2003 | Hamilton | |
| 2003/0179773 A1* | 9/2003 | Mocek et al. | 370/468 |
| 2003/0214962 A1* | 11/2003 | Allaye-Chan et al. | 370/406 |
| 2003/0217365 A1 | 11/2003 | Caputo | |
| 2004/0133907 A1 | 7/2004 | Rodriguez et al. | |
| 2004/0146006 A1* | 7/2004 | Jackson | 370/230 |
| 2004/0187159 A1* | 9/2004 | Gaydos et al. | 725/92 |
| 2005/0058115 A1* | 3/2005 | Levin et al. | 370/344 |
| 2005/0125832 A1* | 6/2005 | Jost et al. | 725/95 |
| 2005/0168323 A1* | 8/2005 | Lenoir et al. | 340/5.74 |
| 2005/0289619 A1* | 12/2005 | Melby | 725/95 |
| 2010/0157928 A1* | 6/2010 | Spinar et al. | 370/329 |

OTHER PUBLICATIONS

Resource Planning and Bandwidth Allocation in Hybrid Fiber-Coax Residential Networks by David Griffith, et al., National Institute of Standards and Technology (NIST), 10 pages, no date.

Communications Technology: Next-Generation Bandwidth Management—The Evolution of the Anything-to-Anywhere Network by Yvette Kanouff, 8 pages, Apr. 1, 2004.

Cisco Intelligent Network Architecture for Digital Video—SCTE Cable-Tec Expo 2004 information page, Orange County Convention Center, Jun. 2004, 24 pages.

OpenVision Session Resource Manager—Open Standards-Based Solution Optimizes Network Resources by Dynamically Assigning Bandwidth in the Delivery of Digital Services article, 2 pages, (copyright 2006), http://www.imake.com/hopenvision).

Session Resource Manager features and information, 2 pages, no date http://www.imake.com/hopenvision).

* cited by examiner

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 37 | 38 | 39 | 40 | 37.5 |
| 33 | 34 | 35 | 36 | 33.75 |
| 29 | 30 | 31 | 32 | 30 |
| 25 | 26 | 27 | 28 | 26.25 |
| 21 | 22 | 23 | 24 | 22.5 |
| 17 | 18 | 19 | 20 | 18.75 |
| 13 | 14 | 15 | 16 | 15 |
| 9 | 10 | 11 | 12 | 11.25 |
| 5 | 6 | 7 | 8 | 7.5 |
| 1 | 2 | 3 | 4 | 3.75 |
| ⌞102 | ⌞104 | ⌞106 | ⌞108 | ⌞110 |

FIG. 1

| VOD SERVICE GROUP - 4 RF CHANNELS | | | | QAM BANDWIDTH USED |
|---|---|---|---|---|
| QAM1 | QAM2 | QAM3 | QAM4 | Mbps |
| STRANDED BANDWIDTH FOR HD VIDEO | | | | 37.5 |
| | | | | 33.75 |
| | | | | 30 |
| 25 | 26 | 27 | 28 | 26.25 |
| 21 | 22 | 23 | 24 | 22.5 |
| 17 | 18 | 19 | 20 | 18.75 |
| 13 | 14 | 15 | 16 | 15 |
| 9 | 10 | 11 | 12 | 11.25 |
| 5 | 6 | 7 | 8 | 7.5 |
| 1 | 2 | 3 | 4 | 3.75 |

HD BANDWIDTH (15 Mbps)

FIG. 2

| VOD SERVICE GROUP - 4 RF CHANNELS | | | | QAM BANDWIDTH USED |
|---|---|---|---|---|
| QAM1 | QAM2 | QAM3 | QAM4 | Mbps |
| HD VOD REQUEST CANNOT BE MET | | HD VOD REQUEST CANNOT BE MET | HD VOD REQUEST CANNOT BE MET | 37.5 |
| | | | | 33.75 |
| 23 | 24 | | | 30 |
| 19 | 20 | 21 | 22 | 26.25 |
| 15 | 16 | 17 | 18 | 22.5 |
| 11 | 12 | 13 | 14 | 18.75 |
| 1 | 2 | 9 | 10 | 15 |
| | | 7 | 8 | 11.25 |
| | | 5 | 6 | 7.5 |
| | | 3 | 4 | 3.75 |

310 — 302  312 — 304  306  308

HD BANDWIDTH (15 Mbps)

*FIG. 3*

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 10 | 20 | 30 | 40 | 37.5 |
| 9 | 19 | 29 | 39 | 33.75 |
| 8 | 18 | 28 | 38 | 30 |
| 7 | 17 | 27 | 37 | 26.25 |
| 6 | 16 | 26 | 36 | 22.5 |
| 5 | 15 | 25 | 35 | 18.75 |
| 4 | 14 | 24 | 34 | 15 |
| 3 | 13 | 23 | 33 | 11.25 |
| 2 | 12 | 22 | 32 | 7.5 |
| 1 | 11 | 21 | 31 | 3.75 |
| 402 | 404 | 406 | 408 | 410 |

FIG. 4

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 10 | 20 | SD ONLY | 530 BANDWIDTH AVAILABLE FOR UP TO 2 HD VOD SESSIONS | 37.5 |
| 9 | 19 | | | 33.75 |
| 8 | 18 | 28 | | 30 |
| 7 | 17 | 27 | | 26.25 |
| 6 | 16 | 26 | | 22.5 |
| 5 | 15 | 25 | | 18.75 |
| 4 | 14 | 24 | | 15 |
| 3 | 13 | 23 | | 11.25 |
| 2 | 12 | 22 | | 7.5 |
| 1 | 11 | 21 | | 3.75 |

502  504  506  508

532

HD BANDWIDTH (15 Mbps)

FIG. 5

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 4 | 14 | 24 | 28 | 37.5 |
| 3 | 13 | 23 | | 33.75 |
| 2 | 12 | 22 | | 30 |
| | 11 | 21 | | 26.25 |
| | 10 | 20 | 27 | 22.5 |
| | 9 | 19 | 26 | 18.75 |
| 1 | 8 | 18 | 25 | 15 |
| | 7 | 17 | | 11.25 |
| | 6 | 16 | | 7.5 |
| | 5 | 15 | | 3.75 |

602  604  606  608

HD BANDWIDTH (15 Mbps) spans from 26.25 to 37.5

*FIG. 6*

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 28 | | | | 37.5 |
| 27 | | | | 33.75 |
| 26 | | | | 30 |
| 25 | | | | 26.25 |
| 21 | 22 | 23 | 24 | 22.5 |
| 17 | 18 | 19 | 20 | 18.75 |
| 13 | 14 | 15 | 16 | 15 |
| 9 | 10 | 11 | 12 | 11.25 |
| 5 | 6 | 7 | 8 | 7.5 |
| 1 | 2 | 3 | 4 | 3.75 |

902   904   906   908

HD BANDWIDTH (15 Mbps) spans rows 25–28; HD_THRESHOLD spans rows 1–24.

FIG. 9

| VOD SERVICE GROUP - 4 RF CHANNELS | | | | QAM BANDWIDTH USED |
|---|---|---|---|---|
| QAM1 | QAM2 | QAM3 | QAM4 | Mbps |
| 22 | 27 | 25 | 28 | 37.5 |
| 21 | 26 | | | 33.75 |
| 20 | 24 | | | 30 |
| 19 | 23 | | | 26.25 |
| 15 | 16 | 17 | 18 | 22.5 |
| 11 | 12 | 13 | 14 | 18.75 |
| 1 | 2 | 9 | 10 | 15 |
| | | 7 | 8 | 11.25 |
| | | 5 | 6 | 7.5 |
| | | 3 | 4 | 3.75 |

1002  1004  1006  1008

HD BANDWIDTH (15 Mbps) spans rows 37.5 to 26.25.
HD_THRESHOLD spans rows 22.5 to 3.75.

FIG. 10

METHOD AND APPARATUS FOR NETWORK BANDWIDTH ALLOCATION

BACKGROUND OF THE INVENTION

1. Field of Invention

The present invention relates generally to the field of network bandwidth allocation, and specifically in one aspect to maximizing the utilization of available bandwidth on the network to support video services with various bit-rates (such as on-demand video) over a content-based network such as a cable television network.

2. Description of Related Technology

Providing "on-demand" (OD) services, such as e.g., video on-demand or VOD, is well known in the prior art. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and customer premises equipment (CPE) to receive, decode and present the video on a display unit. The content is typically distributed to the CPE over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

In most cable networks, VOD programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. In many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group. These numbers work out very well for many deployment scenarios, such as the following example. A typical "service area" neighborhood served by a coaxial cable drop from the cable network consists of 2000 homes, of which about two-thirds are cable subscribers, of which about one-third are digital cable subscribers, of which about 10% peak simultaneous use is expected. Hence, the bandwidth required to meet VOD requirements is $2000 \times (2/3) \times (1/3) \times 0.1$=approximately 40 peak VOD sessions—the exact number supported by a 4 QAM service group.

From the discussion above, the need for a function called Service Resource Manager (SRM) is evident. When a new VOD session request is made, the SRM receives that request, allocates bandwidth on a downstream QAM channel, and sends the information back to the CPE that made the request so that it can tune to the right RF channel and the VOD program therein. Since the SRM controls mapping of incoming VOD session requests to QAM channels within the Service Group, it is an appropriate place for a Cable Operator to enforce RF channel usage policy. In general, SRM should maximize availability of bandwidth to VOD sessions (by efficiently recycling bandwidth from expired sessions) and by ensuring some level of redundancy in case of equipment failure (e.g. a QAM modulator goes down).

More and more US households are beginning to purchase High Definition (HD) televisions (HDTV). By one estimate, by the end of 2004, over 12 million US households will have HDTV displays. To keep up with the trend, MSOs have begun offering HD television programs to cable customers and have recently started looking into deploying HD VOD services.

Entertainment-quality transmission of HD signals requires about four times as much bandwidth as SD. For an exemplary MPEG-2 Main Profile—High Level (MP@HL) video compression, each HD program requires around 15 Mbps bitrate. Although revenues from HD VOD service may not be four times the revenue from SD VOD service, the ability to offer HD VOD service is often critical to cable operators' strategy to be a leader in digital television service offerings.

Use of MPEG HD compression technology for initial deployment of HD VOD services is a logical choice, as HD VOD shares the same MPEG-2 transport layer technology. This approach allows reuse of most of the infrastructure deployed for SD VOD services. By using MPEG multiplexing techniques, SD and HD video streams can be simultaneously carried over the fiber side of the VOD network and multiplexed onto the same QAM channel in a service group. Since roughly 37.5 Mbps bandwidth is available on one QAM-256 carrier, cable operators can mix and match HD and SD VOD sessions using 3.75 Mbps per SD and 15 Mbps per HD VOD stream. For example, on a single QAM carrier, maximum 2 HD VOD sessions can be offered adding up to an aggregate 30 Mbps, with the other 7.5 Mbps being used by 2 SD sessions.

It should be recognized that under prevailing network and CPE design practices, the bandwidth required by a video stream cannot be spread over two QAM carriers. For example, when a new HD VOD session request is granted, all 15 Mbps of bandwidth must be made available on a single QAM carrier.

The role of the aforementioned SRM becomes even more important when managing a Service Group for simultaneous HD and SD VOD sessions. It has the additional task to map VOD sessions to QAM carriers such that it can ensure sufficient bandwidth block for HD VOD session on a QAM carrier in that Service Group. The method used for this mapping should at the same time be able to maximize the amount of bandwidth used without leaving bandwidth stranded on a QAM carrier. Since HD VOD takes much more bandwidth that SD video, during the introduction phase, a cable operator may wish to limit maximum number of sessions of either kind (SD or HD) allowed within a Service Group. Clearly, this number should be easily changeable (upward or downward) if business economics or other considerations demand it.

The foregoing discussion makes no assumptions regarding specific implementation details of the SRM. It will be recognized that the SRM function can be implemented at the edge or core of the network, in a VOD server, or elsewhere. Depending on where this function is implemented, it is variously referred to as NSG (Network Services Gateway) and SRM (Service Resource Manager).

For example, in a Scientific Atlanta network, the VOD server acts as the session resource manager and asks the Digital Network Control System (DNCS) for specific resources. The DNCS responds with a negative or positive response to the request and the VOD server implements the appropriate logic based on the response.

The need for a function that assigns from an available pool of resources to an incoming resource requests is known in the prior art. Various methods have been proposed to perform this function.

For example, U.S. Pat. No. 6,434,141 to Oz, et al. issued Aug. 13, 2002 and entitled "Communication management system and method" discloses a broadband multimedia system including a communication bus, a router, connected to the communication bus and further between a plurality of media sources and a plurality of network transmitters, a session manager, connected to communication bus, where the session manager provides routing instructions to the router, for directing data received from the media sources to the network transmitters for transmitting over a broadband network. No disclosure regarding assignment of bandwidth to VOD session requests is provided.

U.S. Pat. No. 6,201,901 to Imajima, et al. issued Apr. 3, 2001 and entitled "Video data distributing device by video on demand" discloses a requested title recognizing mechanism recognizes the title of a video requested by the subscriber. A VOD service state monitoring mechanism determines whether or not the broadcast of the video is to be provided in the FVOD or the NVOD service, and if there is any available channel for the broadcast. If the broadcast has not been switched from the FVOD service to the NVOD service, then a busy state monitoring mechanism checks the number of the current simultaneous subscribers for the video. If the number is equal to or larger than a threshold, then the busy state monitoring mechanism instructs an NVOD service providing mechanism to broadcast the requested video in the NVOD service. If the number is smaller than the threshold, then the busy state monitoring mechanism instructs an FVOD service providing mechanism to broadcast the requested video in the FVOD service. The patent does not, however, disclose any details regarding RF channel selection from available channels, or assignment of channels to the VOD request.

U.S. Pat. No. 6,169,728 to Perreault, et al. issued Jan. 2, 2001 and entitled "Apparatus and method for spectrum management in a multipoint communication system" discloses an apparatus and method for spectrum management in a multipoint communication system that controls upstream channel usage for secondary stations transmitting information to a primary station and downstream channel usage for secondary stations receiving information from a primary station. The apparatus includes a processor arrangement having a master controller and a plurality of processors, with the processor arrangement connected to a channel interface. The apparatus and method controls channel load balancing, channel congestion, and channel assignment in a multipoint communication system, and controls upstream channels independently from downstream channels. Factors and parameters utilized in such channel control and allocation include error parameters, channel noise parameters, transmit and receive loading factors, and congestion parameters. The patent also discloses implementation of "Least-Loaded" algorithm to assign bandwidth for next session request to the Least-Loaded carrier.

U.S. Pat. No. 6,092,178 to Jindal, et al issued Jul. 18, 2000 and entitled "System for responding to a resource request" discloses a method wherein a trigger is provided in association with a network naming service, such as DNS (Domain Name Service) that handles client requests for an application. The trigger comprises a set of executable instructions referenced by a resource record associated with an identifier of the application. In response to a client request concerning the application, the resource record is retrieved and the instructions are executed. In one implementation of a trigger, a DNS server provides load balancing among a plurality of servers within a network name space (e.g., domain or sub-domain) offering an application program (or replicated service) that is known by a virtual server name. A policy is selected for choosing a preferred server from the plurality of servers according to a specified status or operational characteristic of the application instances, such as the Least-Loaded instance of the application or the instance with the fastest response time. The policy is encapsulated within multiple levels of objects or modules distributed among the plurality of servers and the DNS server. The objects collect and assemble the servers' status and operational characteristics. The information collected by the objects is analyzed to select the server that best satisfies the selected policy. A client request for the application is received by the DNS server, which retrieves a resource record corresponding to the virtual server name. Within the record is the name of a trigger. The trigger is executed to select, or retrieve an identity of, a server to which the client request is to be directed.

U.S. Pat. No. 6,687,735 to Logston, et al. issued Feb. 3, 2004 and entitled "Method and apparatus for balancing distributed applications" discloses a method and apparatus for balancing distributed applications within a client/server network, such as a cable television network. In one aspect, a method of balancing the load of distributed application client portions (DACPs) across various server portions (DASPs) and server machines is disclosed. Statistics are maintained by one or more software processes with respect to the available resources of the servers and their loading; new process threads and/or distributed application server portions are allocated across the servers to maintain optimal system performance as client device loading increases or changes. In another aspect of the invention, an object-oriented distributed application software architecture employing both vertical and horizontal partitions and "mutable" (i.e., transportable) objects is disclosed. The mutable objects may reside on either the server or client portions of the distributed application while maintaining at least one network partition. A runtime environment adapted for the operation of the foregoing object-oriented distributed application, including a message protocol useful for interprocess communication, is also disclosed. Methods for downloading the DACP from the servers, and scaling the DACP at download based on client device configuration, are further disclosed.

The SeaChange MediaCluster Server device manufactured by SeaChange International Corporation comprises a group of fault-resilient VOD servers connected over a network, in effect acting as one server. See, e.g., U.S. Pat. No. 5,862,312 to Mann, et al. issued Jan. 19, 1999 and entitled "Loosely coupled mass storage computer cluster" and its progeny. This patent discloses a method and apparatus redundantly store data, in particular video data objects, in a distributed computer system having at least three processor systems, each processor system being connected in point to point two way channel interconnection with each other processor system. The data is stored in a redundant fashion both at the computer system level as well as the processor system level. Accordingly, the failure of a single processor does not adversely affect the integrity of the data. The computer system can also overlay a switching system connected in a ring fashion for providing a fault tolerance to the failure of a single connected processor system at the switch level.

The SeaChange apparatus further includes a session resource manager (SRM), and associated connection manager (CM) and streaming service (SS). The CM ostensibly allocates bandwidth, selecting the best network delivery path over which to stream data to the requesting entity. The SS "optimizes" bandwidth and provides some level of fail-over behavior, such that software component failure will not necessarily cause loss or tear-down of the underlying sessions. No functionality relating to the selective evaluation of allocation of bandwidth based on different service levels (e.g., SD or HD) is provided within this apparatus, however.

Description and Limitations of Least- and Most-Loaded Algorithms

Consider now the case of SD only VOD requests as shown in FIG. 1. The Service Group is assumed to have 4 QAM channels available. The first column 102 titled QAM1 corresponds to the first QAM carrier allocated to the VOD service. The column is divided into 10 rows, each representing 3.75 Mbps bandwidth available within the total capacity of the carrier. The corresponding aggregate bandwidth used up when each block is assigned to a VOD session is shown in the rightmost column 110 titled "QAM Bandwidth Mbps." From bottom to top, as the number of blocks assigned to VOD sessions increases, the total bandwidth used increases in steps of 3.75 Mbps from 3.75 Mbps (first session) to 37.5 ($10^{th}$ session). Similar bitrate blocks for three other QAM carriers belonging to the same service group are shown in the columns 104, 106 and 108 (QAM2, QAM3 and QAM4 respectively). The number in each box in FIG. 1 comprises a session index corresponding to a VOD session that is currently active.

In case of the Least-Loaded algorithm, every next VOD session request is granted bandwidth on the QAM that has the least bandwidth being used by VOD services (i.e. most free bandwidth available) with the search starting in a fixed sequence. For example, in FIG. 1, the following sequence is assumed for bandwidth search QAM1->QAM2->QAM3->QAM4. As shown in FIG. 1, first VOD request is assigned to QAM1, second request addressed to QAM2, third request is assigned to QAM3, fourth request is assigned to QAM4 and the $5^{th}$ request is assigned by coming back to QAM1 and so on. Therefore, QAM session index number goes up from the bottom row left to right to top row, left to right in each row.

FIG. 2 is shows how the prior art Least-Loaded algorithm approach can leave HD VOD bandwidth stranded. In this example, a number (e.g., 28) consecutive SD VOD session requests are received, followed by a second number (e.g., 3) of HD VOD requests. The first twenty-eight SD VOD requests are allocated evenly on the four QAMs 202, 204, 206, 208 as shown in FIG. 2. The frequency slots remaining after the $28^{th}$ session are assigned the remaining bandwidth 210. This illustrates that the total bandwidth available in this service groups is 45 Mbps (12 slots of 3.75 Mbps each). However, since the bandwidth available in each QAM is only 11.25 Mbps, which is below HD_BANDWIDTH, and since a HD VOD session cannot be allocated bandwidth split over multiple QAMs, the SRM will not be able to grant bandwidth to an incoming HD VOD request. The 45 Mbps available is therefore left "stranded" for the purpose of granting HD VOD sessions. This highlights the limitation of the Least-Loaded algorithm in that it lacks a systematic method of bandwidth allocation to ensure high availability of bandwidth in the Service Group to enable HD VOD sessions. A bandwidth allocation algorithm that can maximize usage of bandwidth usage should be able to make the remaining 45 Mbps bandwidth to three HD VOD sessions (at 15 Mbps per session.)

In the case where HD VOD session requests occur earlier, the Least-Loaded algorithm will eventually leave bandwidth stranded for HD VOD sessions. This is shown in the example of FIG. 3, the first two sessions 310, 312 are allocated bandwidth on QAM1 302 and QAM2 304, respectively. The next twenty-two sessions are SD, and are allocated bandwidth using Least-Loaded algorithm. The available bandwidth resources are now distributed as follows −7.5 Mbps each on QAM1 302 and QAM2 304, 11.25 Mbps on QAM3 306, and 11.25 Mbps on QAM4 308. It can be seen again that although total available bandwidth can support 3 HD VOD sessions, due to splitting the bandwidth among different QAMs, not even a single HD VOD session can be granted bandwidth at this time.

With reference to FIG. 4, the use of Most-Loaded algorithm is now explained. The leftmost column is QAM1 402, corresponding to the first QAM carrier belonging to the VOD Service Group. This column represents the total bandwidth available on this particular QAM carrier and divided into 10 rows, each representing 3.75 Mbps bandwidth available within the QAM carrier. The corresponding aggregate bandwidth used up when each block is assigned to a VOD session is shown in the right-hand column 410. From bottom to top, as the number of blocks assigned to VOD sessions increases, the total bandwidth used increases in steps of 3.75 Mbps from 3.75 Mbps (first session) to 37.5 ($10^{th}$ session). Similar bitrate blocks for the three other QAM carriers 404, 406, 408 belonging to the same service group are shown (QAM2, QAM3 and QAM4, respectively).

When granting bandwidth using Most-Loaded algorithm, every next VOD session request is granted bandwidth on the QAM that has the least bandwidth available (but enough to accommodate the VOD session). In other words, the bandwidth is granted on the Most-Loaded QAM. FIG. 4 shows the case when the entire bandwidth available to the service group is filled by SD VOD sessions. The $1^{st}$ session is granted bandwidth on QAM1 402. For the $2^{nd}$-10th session requests, since QAM1 402 is Most-Loaded, they are granted bandwidth on QAM1. The $11^{th}$ session request is granted bandwidth on the next available QAM as QAM1 is fully occupied. Therefore, FIG. 4 shows the session index increasing from 1 to 40 from bottom-left slot, from bottom to top and then to the next QAM (QAM2 404, QAM3 406, and QAM4 408, respectively).

While prior art Most-Loaded algorithm does not exhibit the stranded bandwidth deficiency of the Least-Loaded algorithm previously described, it does have a salient drawback; specifically in the case of a QAM failure. Since the Most-Loaded algorithm unevenly loads up a QAM, a service outage can spread over multiple customers. Furthermore, when HD and SD VOD services are co-mingled, this assignment cannot effectively spread HD VOD sessions over multiple QAMs, thereby detracting from the failure performance that could be achieved if such spreading were utilized. This inadequacy is highlighted in FIGS. 5 and 6.

In FIG. 5, the VOD session request scenario of FIG. 1 above is again considered, yet this time by allocating session requests using the Most-Loaded algorithm. As shown, first twenty-eight SD VOD requests are stacked up by completely filling up QAM1 502, QAM2 504 and part of QAM3 506. The remaining bandwidth is available for two SD VOD sessions 530 on QAM3 506. As shown in FIG. 5, QAM4 508 has enough remaining bandwidth to grant to two HD VOD streams. However, both of these HD VOD streams (if granted) will occupy the same QAM channel, thereby increasing the risk of VOD session outage if that QAM fails.

In FIG. 6, the VOD session request scenario of FIG. 2 is again considered. Per the Most-Loaded algorithm, the first two HD VOD requests 640, 642 are assigned to QAM1 602. Similarly, session requests 25 and 28 are assigned to QAM4 608. It is evident from the session assignments that while QAM1 602 and QAM4 608 are double-loaded with two HD VOD sessions each, none is carried by QAM2 604 and QAM3 606.

While the prior art referenced above has generally identified the "SRM" function and the use of Least- and Most-Loaded algorithms for allocation, it fails to provide any apparatus or method that minimizes or mitigates the stranding of bandwidth in a QAM channel for an HD VOD session when both HD and SD session requests are present, or addresses the other disabilities highlighted above including increased risk of VOD session outage. Furthermore, the prior art SRMs and algorithms do not allow selective implementation of one or more business policies with the network, or even within a single service group.

Hence, there is a need for improved apparatus and methods that both increase the likelihood of having the capacity to provide HD bandwidth within a Service Group to an HD VOD session request, and minimize the chances of stranding bandwidth. Ideally, such apparatus and methods would be adapted to optimize load balancing across QAM channels, as well as maximize HD session support. Such apparatus and methods would further be configured to spread HD VOD sessions across different QAM channels so as to minimize impact of QAM failures on VOD sessions. Mechanisms to manage the maximum allowed number of HD and sessions within a VOD Service Group, and implement business rules and guarantee service levels for both SD and HD sessions, would also be provided.

SUMMARY OF THE INVENTION

The present invention satisfies the foregoing needs by providing improved apparatus and methods for network bandwidth allocation and optimization, such as may be used in a cable or HFC network.

In a first aspect of the invention, an improved method of allocating bandwidth within a data network is disclosed. The method generally comprises: providing a session request for at least one of first data having a first encoding and second data having a second encoding; evaluating the session request to determine its relationship to at least one first parameter; and allocating bandwidth on the network based at least in part on the aforementioned evaluation. In one exemplary embodiment, the network comprises an HFC cable network having VOD capability and supporting both standard definition (SD) and high definition (HD) data encodings. Session requests for SD and HD sessions are received, identified as to service level, and then analyzed in light of one or more predetermined allocation variables which helps ascertain the proper allocation algorithm(s) to apply. Once selected, the proper algorithm(s) are utilized to allocate bandwidth to the various HD and SD session requests based at least in part on the allocation variables.

In a second aspect of the invention, an improved cable network apparatus adapted to allocate bandwidth to OD sessions is disclosed. The apparatus generally comprises a service manager adapted to receive a plurality of OD session requests for at least first and second levels of service, and assign bandwidth such that maximum opportunity is given to grant OD requests at the second (e.g., HD) level among OD requests at the first (e.g., SD) level, the service manager further being configured to: (i) minimize service disruption by spreading the sessions associated with the requests over multiple QAM channels; and (ii) limit the maximum number of active OD sessions associated with both the first and second levels of service. In one exemplary embodiment, the apparatus comprises a network VOD server apparatus comprising: a digital processor; a storage device operatively coupled to the processor; and a network interface operatively coupled to the processor. A computer program running on the server acts as the session manager.

In a third aspect of the invention, a method of allocating channel bandwidth between heterogeneous (e.g., SD and HD) sessions in a cable network adapted for on-demand (OD) content delivery is disclosed. In one exemplary embodiment, the channel bandwidth comprises a plurality of substantially similar channels formed within a service group, and the method comprises: receiving a plurality of OD session requests from other entities connected to the network, the plurality of requests comprising a first plurality of requests for data encoded according to a first scheme, and a second plurality of requests data encoded according to a second scheme; identifying each request as belonging to the first or second plurality; evaluating existing bandwidth allocation on the channels of the service group in relation to a first predetermined allocation variable relating to the maximum number of SD or HD sessions for that service group; determining if the lowest existing bandwidth allocation in the channels of the service group is below a second allocation variable relating to total bandwidth for a given channel; and allocating at least a portion of the requests to one or more of the channels using at least one of a Least-Loaded or Most-Loaded algorithm based at least in part on the acts of and evaluating and determining.

In a fourth aspect of the invention, an improved cable network apparatus is disclosed having a service manager and adapted to receive a plurality of OD session requests for at least first and second levels of service; and assign bandwidth such that maximum opportunity is given to grant OD requests at the second level among OD requests at the first level. In one embodiment, the service manager is further configured to minimize service disruption by spreading the sessions associated with the requests over multiple QAM channels, and limit the maximum number of active OD sessions associated with both the first and second levels of service.

In a fifth aspect of the invention, improved network server apparatus adapted for coupling to a data network is disclosed. In one embodiment, the server apparatus comprises: a digital processor; a storage device operatively coupled to the processor; a network interface operatively coupled to the processor, and a computer program stored at least partly on the storage device and operative to run on the processor, the computer program being adapted to: receive a request for at least one of first and second data having respective first and second encodings; determine the relationship of the at least one data to at least one first parameter; select one of a plurality of methods for allocating bandwidth based at least in part on the determination of the relationship; and allocate bandwidth to the at least one data on the network based at least in part on the one method.

In a sixth aspect of the invention, network apparatus adapted to selectively allocate bandwidth within a plurality of RF channels existing on a network is disclosed. In one embodiment, the apparatus comprises: a processor; a storage device in operative communication with the processor; a plurality of units adapted to selectively modulate data onto the RF channels; and a session manager adapted to receive a plurality of OD session requests from other entities connected to the network, the plurality of requests comprising a first plurality of requests for data encoded according to a first scheme, and a second plurality of requests data encoded according to a second scheme, the session manager further being adapted to: identify each request as belonging to the first or second plurality; evaluate existing bandwidth allocation on the channels in relation to a plurality of predetermined allocation variables; and allocate at least a portion of the requests to one or more of the channels based at least in part on the identifying and evaluating.

In a seventh aspect of the invention, a hub station for use in a content delivery network capable of supplying content on demand (COD) services is disclosed. In one exemplary configuration, the content delivery network comprises a central headend station coupled to the hub station using a network, and the hub station comprises a hub media server having at least one content port; a radio frequency management infrastructure, the radio frequency management infrastructure coupled to the at least one content port of the hub media server and adapted to receive a content stream from a content transport network. The radio frequency management infrastructure is adapted to transmit the content stream to a plurality of set-top boxes over a distribution network. The hub media server further comprises a session manager adapted to receive a plurality of COD session requests from the set-top boxes, the plurality of requests comprising a first plurality of requests for data encoded according to a first scheme, and a second plurality of requests data encoded according to a second scheme, the session manager further being adapted to: identify each request as belonging to the first or second plurality; evaluate existing bandwidth allocation on channels of the radio frequency management infrastructure in relation to a plurality of predetermined allocation variables; and allocate at least a portion of the requests to one or more of the channels based at least in part on the acts of identifying and evaluating.

In an eighth aspect of the invention, a method of allocating assets within a content-based network is disclosed, the method generally comprising: categorizing a plurality of users of the network according to a tiered service structure; receiving a plurality of service requests from at least a portion of the plurality of users; and selectively allocating the assets to the at least portion of users based on the tiered service structure. In the exemplary embodiment, the assets comprise RF channel bandwidth associated with one or more service groups, and the tiered service structure comprises a plurality of different service levels.

In a ninth aspect of the invention, an improved method of increasing the likelihood of having sufficient capacity to provide high definition (HD) sessions within a Service Group is disclosed. The method generally comprises: receiving a plurality of service requests, each request relating to one of at least HD or standard definition (SD) service; evaluating the plurality of requests in order to determine an allocation scheme; and allocating the bandwidth based at least in part on allocation scheme; wherein the scheme is adapted to minimize wasted or unused bandwidth within the one or more service groups, the minimizing substantially providing the increased likelihood. In one embodiment, the allocation scheme is accomplished at least in part based on least- or most-loaded algorithms.

In a tenth aspect of the invention, an improved session resource manager (SRM) entity for use in a content-based network is disclosed. The exemplary embodiment of the SRM is configured to: receive a plurality of session requests for at least first and second levels of service; and assign bandwidth such that maximum opportunity is given to grant session requests corresponding to the second level among session requests at the first level, the service manager further being configured to minimize service disruption by spreading the sessions associated with the requests over multiple QAM channels, and limit the maximum number of active sessions associated with both the first and second levels of service.

In an eleventh aspect of the invention, a method of spreading OD sessions across different QAMs so as to minimize the impact of QAM failures on VOD session is disclosed. The method generally comprises: receiving a plurality of session requests for at least first and second levels of service; and assigning bandwidth so as to spread the sessions associated with at least the requests for the first level of service over multiple QAM channels while simultaneously minimizing stranded or unused bandwidth within the QAMs. In one embodiment, the first level of service comprises an HD service, and the OD sessions comprise VOD sessions.

In a twelfth aspect of the invention, a method of conducting business via a cable network having a plurality of users is disclosed. In one embodiment the method comprises: receiving from the users a plurality of service session requests each relating to one of at least two different levels of service; identifying at least one criterion which is desired to be met; and allocating assets within the network to the session requests so as to satisfy the at least one criterion.

BRIEF DESCRIPTION OF THE DRAWINGS

FIG. 1 is a graphical illustration of an exemplary QAM channel service map using a Least-Loaded algorithm to distribute VOD session requests when all requests are for SD format video.

FIG. 2 is a graphical illustration of an exemplary QAM channel service map showing how bandwidth becomes unavailable for HD VOD session requests when using a Least-Loaded algorithm to assign bandwidth to SD VOD sessions according to a first request scenario.

FIG. 3 is a graphical illustration of a second exemplary QAM channel service map showing how bandwidth becomes unavailable for HD VOD session requests when using a Least-Loaded algorithm to assign bandwidth to SD VOD session requests according to a second request scenario.

FIG. 4 is a graphical illustration of an exemplary QAM channel service map using a Most-Loaded algorithm to distribute VOD session requests when all requests are for SD format video.

FIG. 5 illustrates an exemplary QAM channel allocation for VOD service request scenario using a prior art Most-Loaded algorithm.

FIG. 6 illustrates and exemplary channel allocation resulting from applying a prior art Most-Loaded algorithm to VOD service requests according to the scenario of FIG. 3.

FIG. 9 is a graphical illustration of the application of exemplary allocation methods of FIG. 8 in the context of a first VOD SD/HD service request scenario.

FIG. 10 is a graphical illustration of the application of exemplary allocation methods of FIG. 8 in the context of a second VOD SD/HD service request scenario.

DETAILED DESCRIPTION OF THE INVENTION

Figure 7:
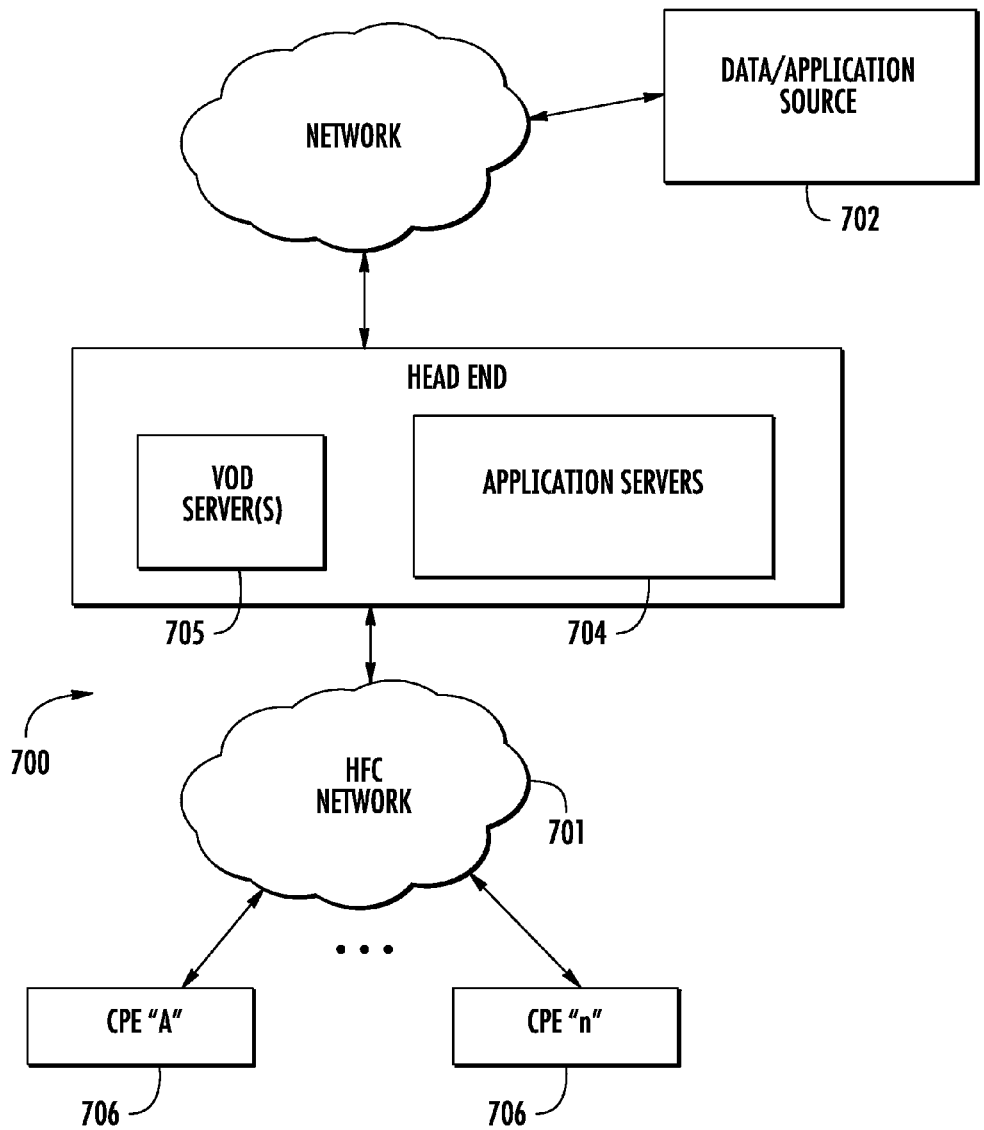
FIG. 7 is a functional block diagram illustrating an exemplary HFC network configuration useful with the present invention.

Reference is now made to the drawings wherein like numerals refer to like parts throughout.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "QAM" refers to modulation schemes used for sending signals over coaxial cable networks. Such modulation scheme might use any constellation level (e.g. QAM16, QAM64, QAM256 etc.) depending on details of a cable network.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the term "MSO" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, wireless nodes, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

Overview

The present invention comprises improved methods and apparatus for "intelligently" allocating bandwidth according to multiple different service levels or data rates in a network such as an HFC cable network. In the exemplary embodiment, a service resource manager (SRM) is provided which allocates bandwidth to session requests having different data rates (here, HD and SD) on two or more downstream channels (e.g., 4 RF QAM channels in a service group, although other numbers of channels might comprise a service group). This intelligent allocation scheme achieves multiple goals, including (i) increasing the likelihood of having the capacity to provide HD bandwidth within a Service Group to an HD VOD session request, and (ii) minimizing the chances of stranding bandwidth within a channel or service group. This provides great benefits in terms of both network operational efficiency and capacity, as well as user (customer) satisfaction in their on-demand experience.

Specifically, the invention optimizes load balancing across QAM channels, as well as maximizing HD session support through use of Least-Loaded and Most-Loaded allocation algorithms in conjunction with a plurality of user-definable variables which control operation of the SRM. The SRM and variables also allow for dynamic tuning of the network under varying service and load conditions in order to further its operation. Spreading of HD VOD sessions across different QAM channels within the service group also advantageously minimizes the impact of QAM failures on VOD sessions.

The present invention may also be utilized to provide load balancing and bandwidth allocation directly out of a server device (e.g., a head-end VOD server) if desired.

In the broader sense, the methods of the present invention can be used in literally any context where the allocation of limited network resources must be optimized according to one or more variables, and/or structured to meet desired service requirements. In this fashion, the invention treats these resources as a "floating pool" which can be dynamically allocated in order to optimize the desired variables.

Mechanisms to manage the maximum allowed number of HD and sessions within a VOD Service Group, and implement business rules and guarantee service levels for both SD and HD sessions, are also provided.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures where bandwidth allocation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a purely satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth allocation between three service levels (SD, HD, and UHD). As another option, multiple levels or rates may be present with one of the aforementioned service levels, such as where the SD level includes levels SD1, SD2, . . . SDn, and the HD level similarly includes HD1, HD2, . . . HDn, with each of these sub-levels having different data rates and/or other characteristics. Alternatively, bandwidth allocation according to the present invention may be performed not based on definition level (data rate), but some other attribute such as for example type or level of service, or location or identity of service group. Various alternate allocation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

FIG. 7 illustrates a typical content-based network configuration with which the bandwidth allocation methodology of the present invention may be used. The various components of the network 700 include (i) one or more data and application origination points 702; (ii) one or more application distribution servers 704; (iii) one or more VOD servers 705, and (iv) consumer premises equipment (CPE) 706. The distribution server(s) 704, VOD servers 705 and CPE(s) 706 are connected via a bearer (e.g., HFC) network 701. A simple architecture comprising one of each of the aforementioned components 702, 704, 705, 706 is shown in FIG. 7 for simplicity, although it will be recognized that comparable architectures with multiple origination points, distribution servers, VOD servers, and/or CPE devices (as well as different network topologies) may be utilized consistent with the invention. For example, the head-end architecture of FIG. 7a (described in greater detail below) may be used.

The application origination point 702 comprises any medium that allows an application (such as a VOD based application) to be transferred to a distribution server 704. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 704 comprises a computer system where such applications can enter the network system. Distribution servers are well known in the networking arts, and accordingly not described further herein.

The VOD server 705 a computer system where on-demand content can be received from one or more data sources 702 and enter the network system. These servers may generate the content locally, or alternatively act as a gateway or intermediary from a distant source. The VOD server 705 includes the Session Resource Manager (SRM) functionality, and asks the Digital Network Control System (DNCS) for resources. The DNCS responds with negative or positive response to the request, and the VOD server implements the appropriate resource allocation logic, as discussed subsequently herein with respect to FIGS. 8-10. An exemplary VOD server with SRM is described subsequently herein with respect to FIG. 11.

The CPE 706 includes any equipment in the "consumers' premises" (or other locations, whether local or remote to the distribution server 704) that can be accessed by a distribution server 704. Such CPEs 706 comprise processors and associated computer memory adapted to store and run the downloaded or resident application, as well as receive the streamed in-band content. In the present context, at least a portion of the VOD application is typically downloaded to the CPE 706, wherein the latter executes the downloaded application(s)/components, although it will be recognized that all of applications may conceivably be uploaded to the server, or alternatively transferred to another device, such as other networked CPE or the like.

Figure 7A:
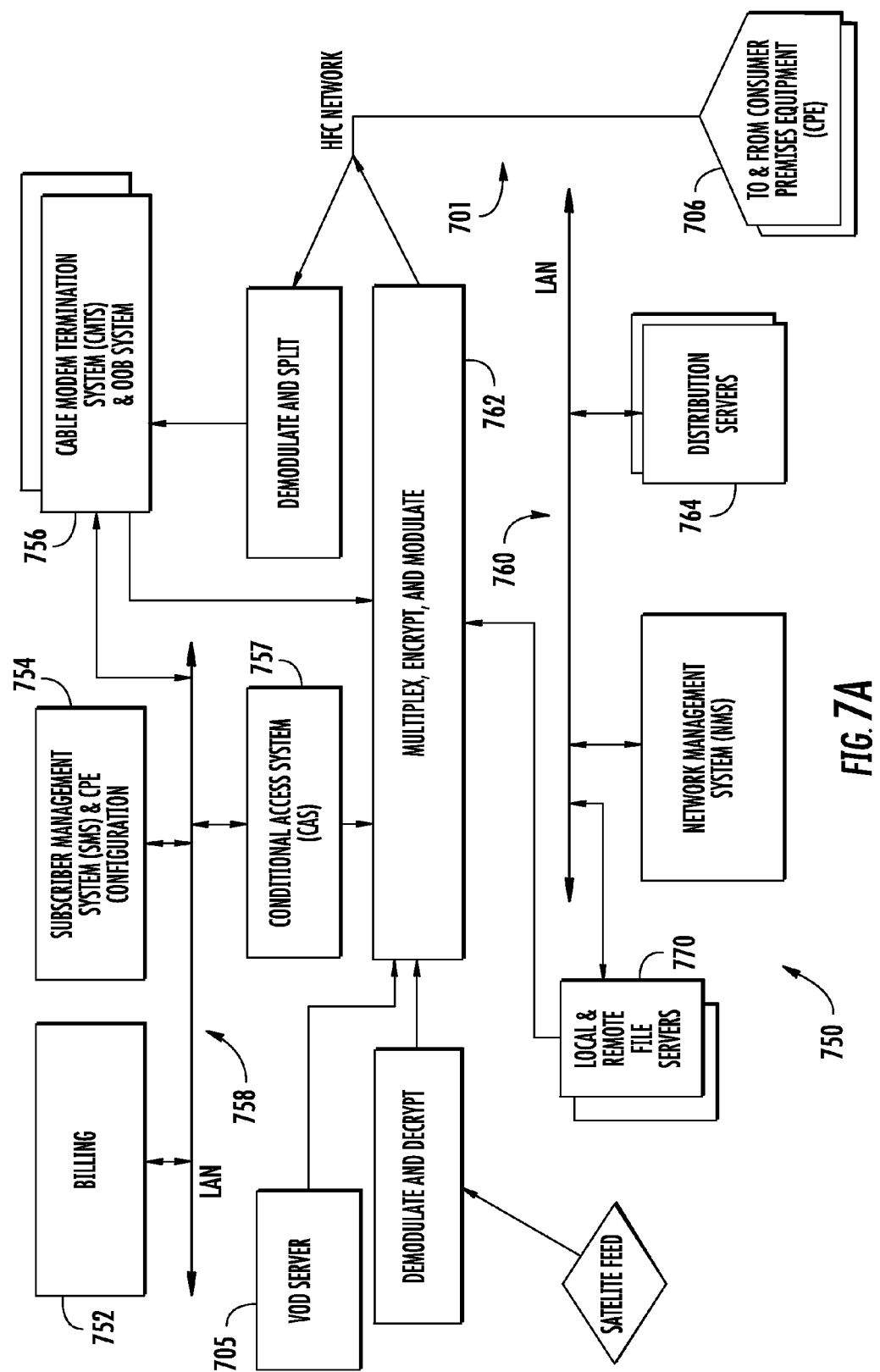
FIG. 7a is a functional block diagram illustrating one exemplary head-end configuration of an HFC network useful with the present invention.

Referring now to FIG. 7a, one exemplary embodiment of a head-end architecture useful with the present invention is described. As shown in FIG. 7a, the head-end architecture 750 comprises typical head-end components and services including billing module 752, subscriber management system (SMS) and CPE configuration management module 754, cable-modem termination system (CMTS) and OOB system 756, as well as LAN(s) 758, 760 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 7a is high-level, conceptual architecture and that each MSO may have multiple head-ends deployed using custom architectures.

The architecture 750 of FIG. 7a further includes a multiplexer/encrypter/modulator (MEM) 762 coupled to the HFC network 701 adapted to "condition" content for transmission over the network. In the present context, the distribution servers 704 are coupled to the LAN 760, which provides access to the MEM 762 and network 701 via one or more file servers 770. The VOD servers 705 are coupled to the LAN 760 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 750 to the CPE 706 ("downstream") are multiplexed together in the head-end and sent to neighborhood hubs (not shown).

Content (e.g., audio, video, etc.) is provided in each downstream (in-band) channel associated with the relevant service group. To communicate with the head-end, the CPE 706 uses the out-of-band (OOB) or DOCSIS channels and associated protocols. The OCAP 1.0 specification provides for networking protocols both downstream and upstream.

In another embodiment, the network infrastructure includes one or more on-demand file or "carousel" functions. Specifically, the present invention contemplates that not only will more traditional movie (e.g., MPEG) data be allocated and delivered though the bandwidth allocation mechanisms described herein, but also data for interactive applications or other types of applications. For example, in a fashion not unlike existing approaches to ordering an on-demand (OD) movie, an application would request data, images, links, audio files, video files, and the like in an on-demand fashion. These unique data types may comprise single files, or be combined into a single or multiple data carousels, with each carousel potentially having a different data rate. Upon receiving an OD service request, the allocation algorithm can optimize the placement of these sessions on QAM resources for delivery to the requester. Hence, the OD downstream service can be considered a third and separate level of service (i.e., SD, HD, and OD), or alternatively can be considered as one or more subclasses within the existing levels; i.e., where SD includes SD-OD, and HD includes HD-OD. Myriad other organization schemes are also possible.

It will also be recognized that the multiple servers (VOD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned U.S. Patent Application Publication No. 20020059619 to Lebar published May 16, 2002 and entitled "Hybrid central/distributed VOD system with tiered content structure" which is incorporated herein by reference in its entirety. Specifically, a hybrid central/distributed and tiered video on demand (VOD) service network with tiered content structure is disclosed. In particular, the system uses media servers located in both the headend and hub stations. Set-top boxes generally would be supplied VOD services from the high-demand content media servers located in the hub station nearest to the user. The central media server located in the headend would be used as an installed backup to the hub media servers; as the primary source for lower demand VOD services and as the source of the real time, centrally encoded programs with PVR (personal video recorder) capabilities.

By distributing the servers to the hub stations, the size of the fiber transport network associated with delivering VOD services from the central headend media server is reduced. Hence, each user has access to several server ports located on at least two servers. Multiple paths and channels are available for content distribution to each user, assuring high system reliability and enhanced asset availability. Substantial cost benefits are derived from the reduced need for a large content distribution network and the reduced storage capacity requirements for hub servers.

Many other permutations of the foregoing system components and communication methods may also be used consistent with the present invention, as will be recognized by those of ordinary skill in the field.

Figure 8:
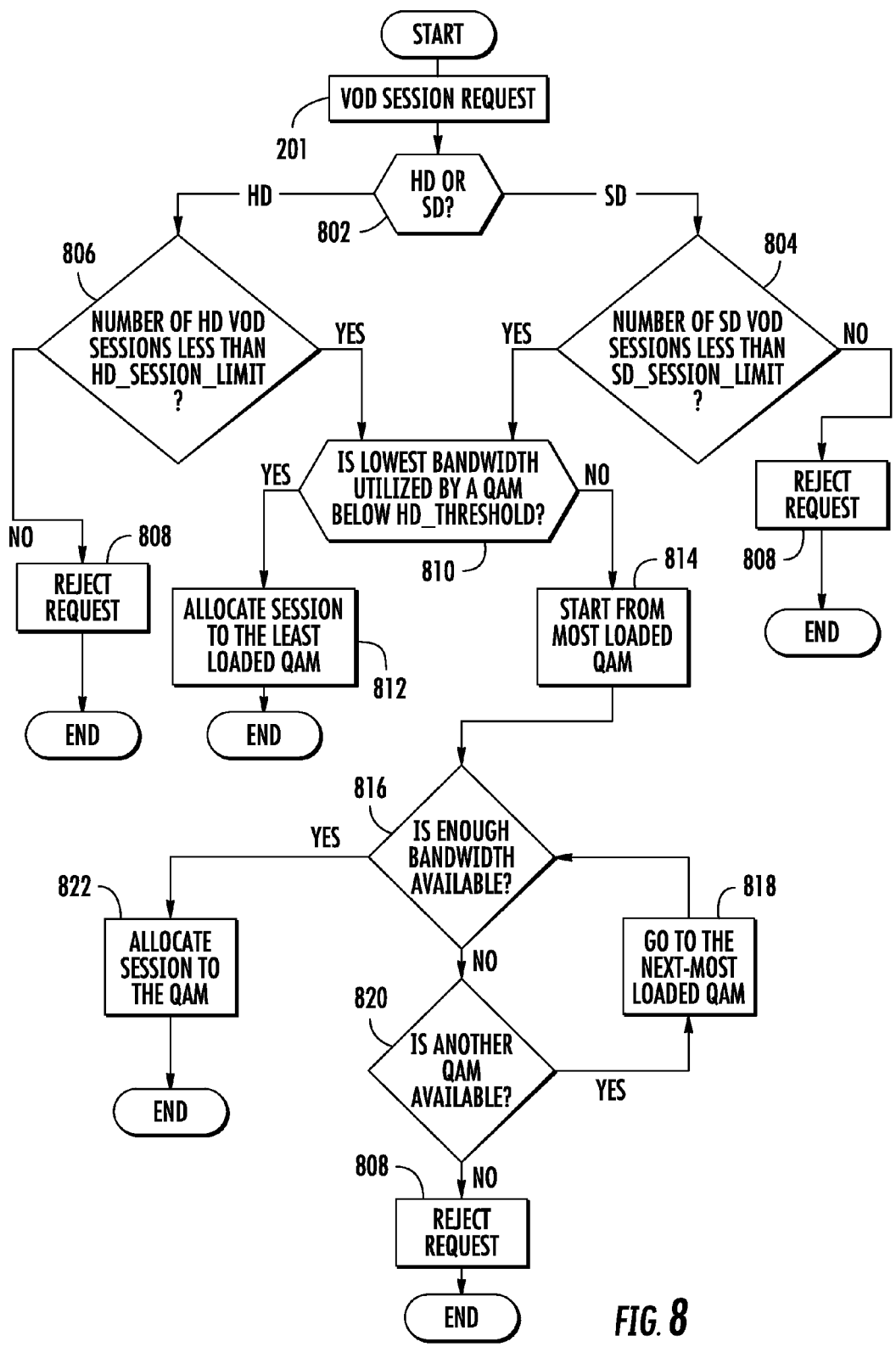
FIG. 8 is a logical flowchart illustrating a first embodiment of the allocation method according to the present invention.

Referring now to FIGS. 8-10, various exemplary embodiments of the bandwidth allocation methodology according to the invention are described. The following discussion is cast in terms of an algorithm used by an exemplary Service Manager entity to assign bandwidth to an incoming on-demand (e.g., VOD) session request in the context of a 4 QAM channel Service Group, although it will be appreciated that any number of channels, modulation schemes (including, e.g., FSK, PSK, GMSK, and BSK) and frequency bandwidths may be used consistent with the invention. As in FIGS. 1-6 discussed above, the exemplary bandwidth utilization can be logically described in terms of a matrix having four (4) columns, one for each QAM carrier, with each column having 10 rows, each representing 3.75 Mbps bandwidth portions, as shown in FIGS. 9 and 10.

Two scenarios are examined which illustrate the operation of various aspects of the present invention in terms of an OD service request. These scenarios are consistent with those previously described with respect to FIGS. 1-6 herein in order to clearly illustrate the distinctions, features and advantages of the present invention.

VOD Service Request Scenario 1

This scenario consists of a first number (e.g., 28) consecutive SD VOD session requests, followed by a second number (e.g., 3) of HD VOD requests. For the sake of simplicity, no VOD session is assumed to terminate during the period that requests are generated. Therefore, re-allocation of bandwidth from terminated VOD sessions is not considered, although it will be appreciated that the invention can be adapted to re-allocate bandwidth from such terminated sessions in any number of ways.

VOD Service Request Scenario 2

This second scenario consists of a first number (e.g., 2) consecutive HD VOD session requests (session numbers 1 and 2) followed by a second number (here, 22) SD VOD requests, followed by a third number (here, one) of HD VOD requests (session number 25), followed by a fourth number (e.g., 2) of SD VOD requests, followed lastly by a fifth number (e.g., one) HD VOD request (session 28), at which point the entire bandwidth available in this 4 QAM service group is filled. Again, for the sake of simplicity, no VOD session is assumed to terminate during the period that requests are generated; hence, re-allocation of bandwidth from terminated VOD sessions is not explicitly considered.

When performing network traffic model analysis, certain key variables contribute to the performance of the system. They include the probability of the arrival of the session setup request, and the probability of the session hold-time. These variables contribute to the loading factor with respect to a blocking factor, which determines the number of resources required to serve a given population of users.

When working with a single service level (encode rate), the system-blocking factor is only based on the VOD Service Group. With the commingling of different encode rates/levels a new blocking factor is introduced into the system. This is the QAM blocking factor and it is based on the probability of the having enough bandwidth to support an HD session within a given QAM. While there may be enough bandwidth within the VOD Service Group to support an HD session if it is not all available on a single QAM channel, the HD session is blocked and the bandwidth is considered "stranded" with regard to its ability to support an HD session. As previously described, this occurs when the bandwidth consumption on a given QAM exceeds the maximum rate of the QAM minus the HD rate (e.g., 37.5 Mbps–15 Mbps=22.5 Mbps).

Additionally, the probability of whether the next session request to arrive is either a SD or HD session factors into the allocation algorithm. This probability is based on multiple factors including HD DSTB penetration rates, buy rates, demographics and content availability. The hold-time of a session will also be impacted based on the length of HD content offered.

It will be appreciated that the allocation models presented herein represent a somewhat simplistic view of the allocation of sessions in that they do not explicitly consider the hold-time of sessions, or departures. However, this has no practical effect on the operation or efficacy of the allocation algorithm, since session hold-time and thus session departure has been factored into the allocation models. Specifically, in the exemplary embodiment, the allocation decision or calculus is performed at the time a session arises; i.e., in response to a session request. Hence, the bandwidth allocation decision is based on information present at that particular point in time, and considers all such requests as opposed to each in isolation. Since departures are generally (although not required to be) random, and a departure will immediately be reflected in the available bandwidth parameter (i.e., as a departure occurs, available bandwidth will increase immediately), the algorithm need not explicitly track departures or hold time. It merely needs to know what demand is at any given point in time.

However, notwithstanding the prior discussion, the present invention may also be configured to utilize consideration of hold-times and/or departures if desired. For example, in one variant, a mean or estimated average hold-time could be used as the basis for a predictive algorithm; i.e., one which load-balances or allocates based on a prediction of future demand and hence available bandwidth. Such algorithm need not be wholly predictive, such as where a running mean or other value is generated from anecdotal data obtained from the system during a prior period of operation. For example, a moving window approach might be used, wherein the mean or median hold time is calculated during a prior moving X-hour period, the result of this calculation being used in a weighted equation (along with other factors such as time of day, etc.) to arrive at an "intelligent" estimate of average hold-time at some point in the future. Consider, e.g., where it is known that HD sessions on average have longer hold-times than SD sessions, and that HD or SD sessions initiated in the evening hours (local time) have longer average hold times than those initiated at other times (due to, say, more people watching HD full-length movies in the evening after work). The present invention could therefore use the anecdotal information gathered during the same time window for the prior day (or week) as a crude estimate of demand during this same period, and reserve additional HD bandwidth for subsequent allocation during this period of increased demand. Should the increased demand not materialize for whatever reason, such as due to an unscheduled Presidential address or the like, then the reserved bandwidth can be freed up as desired. Those of ordinary skill will recognize that myriad other algorithmic or predictive approaches may be used consistent with the invention as well, the foregoing being merely illustrative.

A number of configurable variables are used by the Session Resource Manager (SRM) of the present invention in order to provide the various control features, as described below. It will be appreciated by those of ordinary skill that these particular variables or parameters are adapted specifically to the exemplary SD/HD paradigm described herein, and hence are merely illustrative of the broader concepts. Other variables may be used in place of or in conjunction with the following, and the following variables may also be redefined as necessary for the particular context. For example, where a third service level or data rate is used (e.g., UHD), one or more corresponding UHD variables may be specified. Furthermore, tiers of service groups can be employed, such as where the both standard-definition VOD and high-definition VOD are present. Bandwidth can then be allocated by the service within a given group if desired. As yet another option, "logical" allocation schemes may be employed, as described in detail subsequently herein regarding various business paradigms.

The use of other service levels, rates, or groupings may also necessitate creation of new variables relating one or more of the service levels described herein to that new service level. For example, where an SD service level has three sublevels (SD1, SD2, and SD3) each with different rates, it may be desirable to generate an aggregated effective data rate for the different levels, such effective data rate being used itself as an allocation variable.

It is also noted that the allocation mechanisms described herein may be conducted at different layers of abstraction (or across different variables) either alone or in conjunction with the channel bandwidth allocation techniques previously described. For example, in one variant, allocation of assets such as bandwidth occurs on a logical channel basis. This is somewhat analogous to the well known virtual path identifier (VPI) and virtual channel identifier (VCI) used in asynchronous transfer mode (ATM) network systems. Specifically, while bandwidth is typically thought of in the context of the physical channel (e.g., four 6-MHz RF channels in a given service group), allocation may be applied irrespective of the physical layer considerations; i.e., at a higher logical layer. Consider the case where multiple 6-MHz physical channels exist. With packetized data, each packet need not take the same physical pathway or channel to arrive at its destination; packets from a given logical stream may be distributed across several of these physical channels. Similarly, all packets within an MPEG or similar packetized data stream need not necessarily traverse the same physical RF channel between the head end and the CPE, but rather may comprise one or more logical channels. Hence, the bandwidth allocation mechanism described herein can be applied to the logical channel, i.e., logically related packet stream, versus (or even in conjunction with) application to the physical channels. Implementation of logical channel management and flow control is well known to those of ordinary skill in the networking arts, and hence the methods of the present invention are readily adapted to the logical channel context by such artisans provided the present disclosure.

The following exemplary variables advantageously allow "tuning" of various portions of the network (or even the network as a whole; see, e.g., the subsequent discussions relating to a global SRM) for optimal performance and/or to implement desired business rules.

1. HD_Threshold

This variable represents the upper bandwidth threshold which is used to switch between a Least-Loaded model to a Most-Loaded model. Initially, this parameter may be set to the maximum bandwidth within a QAM channel minus the HD encode rate, or 37.5 Mbps–15 Mbps=22.5 Mbps. Once the bandwidth utilization within a QAM channel within an OD Service Group reaches this threshold, the allocation algorithm of the present invention will begin stacking sessions on the Least-Loaded QAM which exceeds the HD threshold value.

By manipulating the HD_Threshold value, the system's performance can be tuned based on the contention found in the system. By setting the HD_Threshold to a value of 0 Mbps, the exemplary allocation manager will allocate sessions according to a 'Most-Loaded' algorithm. Alternatively, by setting the HD_Threshold to 37.5 Mbps, the manager will allocate according to a 'Least-Loaded' algorithm.

2. HD_Session_Limit

This variable represents the maximum number of simultaneous HD sessions within a VOD Service Group. Since the exemplary HD sessions require four times the amount of bandwidth when compared to an SD session, there needs to be a way of limiting the number of HD sessions so that they cannot use all the available bandwidth within a Service Group, thereby resulting in denial of service. By limiting the number of HD sessions, enough bandwidth to support SD VOD sessions is reserved.

3. SD_Session_Limit

This variable represents the maximum number of simultaneous SD sessions within a VOD Service Group. By limiting the number of SD sessions, enough bandwidth to support HD VOD sessions is reserved.

4. SD_Rate

This variable represents that data rate associated with the first service level (e.g., standard definition). The value is typically 3.75 Mbps, although this may be varied as previously discussed depending on the prevailing technology and service levels in use.

5. HD_Rate

This variable represents that data rate associated with the second service level (e.g., high definition). The value is typically 15 Mbps, although this may be varied as previously discussed depending on the prevailing technology and service levels in use.

6. HD_Session_Count

This variable represents the number of current HD sessions. In the SRM log after session setup, an entry can be made to include the Service Group, HD_Session_Count, SD_Session_Count and bandwidth consumption per QAM channel.

7. SD_Session_Count

This variable represents the number of current SD sessions. In the SRM log after every session setup an entry needs to be made to include the Service Group, HD_Session_Count, SD_Session_Count and bandwidth consumption per QAM channel.

In operation, once the HD threshold value is reached across any QAM channel within a Service Group, the algorithm begins "stacking" sessions on the QAM channel that has exceeded the HD threshold. This method of allocating sessions will increase the probability of having the capacity to support an HD stream. This also allows a mix of 36 SD sessions and one HD sessions, as described below.

Referring to FIG. 8, an exemplary method 800 of allocating bandwidth is described in detail. When a VOD session request is received (801), the SRM makes a first decision (step 802)

on whether the request is for HD VOD session or SD VOD session. If the request is for HD VOD session, then the SRM determines whether allocating this request will violate the upper bound on maximum HD VOD sessions allowed. This (step 806) is accomplished by making sure that number of current HD VOD sessions is less than variable HD_Session_Limit. If the number of sessions is not less than the HD_Session_Limit, the request is rejected (step 808) and both the user and Network Management System are notified of the decision. The procedure is ended at this time. If on the other hand, number of active HD VOD sessions is below HD_Session_Limit, the decision of whether to utilize a Most-Loaded or Least-Loaded approach is made (step 810) as further described below. During the decision process (step 802), if the session request is determined to be SD, a similar evaluation of whether number of current active SD sessions is below or above SD_Session_Limit is made (step 804). If the new SD VOD request cannot be granted due to violation of session limit policy, the request is rejected (step 808) and the procedure terminates. If the new SD VOD request is deemed to not violate SD_Session_Limit, the aforementioned decision of whether to utilize a Most-Loaded or Least-Loaded approach is made (step 810).

The algorithm enters step 810 of FIG. 8 if the number of sessions will not violate threshold policies as described above. In step 810, the SRM determines if it should attempt to assign bandwidth to this session request in Least-Loaded or Most-Loaded fashion. The SRM determines if the lowest bandwidth utilization of a QAM channel in the service group is below the HD_Threshold value. If so, the SRM allocates bandwidth from the Least-Loaded QAM to the session request (as shown in step 812). Otherwise, the SRM evaluates the Most-Loaded QAM (step 814) to determine if enough bandwidth is available for the request (step 816). If enough bandwidth is available, the SRM assigns the bandwidth to the session request (step 822) and terminates the decision process. If enough bandwidth is not available on the Most-Loaded QAM, the SRM determines if another QAM has any free bandwidth. If no other QAM has free bandwidth, the SRM rejects the request per step 808 and terminates the decision process. If another QAM is available, the SRM evaluates the available resources on the next QAM with most bandwidth used (step 818) and repeats the procedure 800 from step 816 onwards. The result of this iteration is that the new request will be either granted bandwidth on one of the QAMs or will be rejected.

Scenario 1

In the context of Scenario 1 described previously herein, the method 800 would be implemented as shown in FIG. 9 (barring any session departures). In this example, sessions 1 through 24 are below the HD_Threshold and are allocated in a 'Least-Loaded model'.

The 25$^{th}$ SD session request is above the HD_Threshold and is allocated on the first Most-Loaded QAM channel (in this example, QAM1 902).

The 26$^{th}$ SD session request is above the HD_Threshold, and is allocated on the first available Most-Loaded QAM (here QAM1 902). Similarly, the 27$^{th}$ and 28$^{th}$ SD session requests are above the HD_Threshold and are allocated on the first Most-Loaded QAM channel (QAM1 902).

The 29$^{th}$ HD session request is above the HD_Threshold and is allocated on the first QAM with enough available bandwidth to support the HD session (QAM2 904).

The 30$^{th}$ HD session request is above the HD_Threshold and is allocated to the first Most-Loaded QAM channel with enough bandwidth available (here, QAM3 906).

Lastly, the 31$^{st}$ HD session request is above the HD_Threshold and is allocated to the first Most-Loaded QAM channel with enough bandwidth available (QAM4 908).

Scenario 2

FIG. 10 illustrates the more complicated example of allocating across the HD_Threshold (Scenario 2). As shown in FIG. 10, the HD Session 1 is below the HD_Threshold and is allocated 'Least-Loaded' model to QAM1 1002. The 2$^{nd}$ Session is an HD session with maximum bandwidth utilization below the HD_Threshold, and is assigned to QAM2 1004 per the Least-Loaded algorithm. Sessions 3 through 18 are similarly allocated across all four QAMs 1002, 1004, 1006, 1008 per the Least-Loaded algorithm.

The 19$^{th}$, 20$^{th}$, 21$^{st}$ and 22$^{nd}$ session requests are all SD and are above the HD_Threshold, and hence are allocated on the first Most-Loaded QAM channel (in this example, QAM1 1002).

The 23$^{rd}$ and 24$^{th}$ session request are SD and above the HD_Threshold and are allocated on the next available Most-Loaded QAM channel (here QAM2 1004).

The 25$^{th}$ session request is HD and is above the HD_Threshold, and therefore is allocated on the first Most-Loaded QAM channel with enough bandwidth available (QAM3 1006 in the present example). The 26$^{th}$ session request is HD and is above the HD_Threshold, and is allocated on the first Most-Loaded QAM channel with enough bandwidth available (QAM4 1008). The 25$^{th}$ and 26$^{th}$ SD session requests are above the HD_Threshold and are allocated on the first Most-Loaded QAM channel (here QAM1 1002).

Lastly, the 27$^{th}$ and 28$^{th}$ session requests are above the HD_Threshold and are allocated on the first Most-Loaded QAM channel (QAM2 1004).

It will be recognized that while the foregoing scenarios and embodiments are cast in terms of selective allocation or trade-off between Least-Loaded and Most-Loaded algorithms, other types of algorithms or variations may be substituted for one or both of the foregoing. For example, in one alternate embodiment, the allocation of bandwidth between the service group channels comprises a weighting based on proximity to the relevant parameter(s) (e.g., HD threshold value or SD session limit). In another exemplary configuration, so-called "fuzzy logic" or Bayesian variables may be utilized to control the operation of the SRM (e.g., "lightly" loaded, "moderately loaded", "heavily loaded", etc.).

Furthermore, the SRM need not be restricted to one service group. In a first embodiment, a single VOD server with SRM is adapted to control multiple service groups independently; i.e., the SRM functions with respect to each service group independently based on that service group's own variables. Alternatively, the SRM can be made "global" in nature, such as where one SRM is configured to operate at a higher level of abstraction within the network, in effect optimizing the behavior of a plurality of local (e.g., SG-specific) SRMs with which it is in communication. As discussed in greater detail below with respect to business rules implementation, the use of a global SRM allows for optimizations and load balancing on a system-wide basis, thereby permitting more broadly scoped business rules to be implemented on a network or aggregation of networks.

In another embodiment, the allocation and optimization (and balancing) process for a service group can be distributed across multiple VOD servers/SRMs (or other entities), such that the decision process for allocation is distributed in nature.

In yet another embodiment, one SRM (or group of related SRMs) are used to allocate SD/HD session requests across multiple homogeneous or heterogeneous service groups, such as where multiple different QAM channels within different groups can be used to service a given session request.

In yet still another embodiment, aggregations or different divisions of two or more service group QAM channels can be used as the basis for the SRM decision process. For example, under certain circumstances, it may be advantageous to treat the four (4) QAM channels in a given service groups as two "super" channels for purposes of allocation, or to hold one or more channels in reserve for unanticipated increases in session request activity. Myriad other possibilities will be recognized by those of ordinary skill given the present disclosure.

In yet another variant, the methods and apparatus described herein can be used to provide load-balancing within a server farm or similar aggregation of servers used to provide content to the network. For example, one server can be balanced as previously described herein, or alternatively all or a subset of the "farm" can be balanced. Furthermore, multiple farms (or individual server entities or processes with multiple farms) can be balanced.

Figure 11:
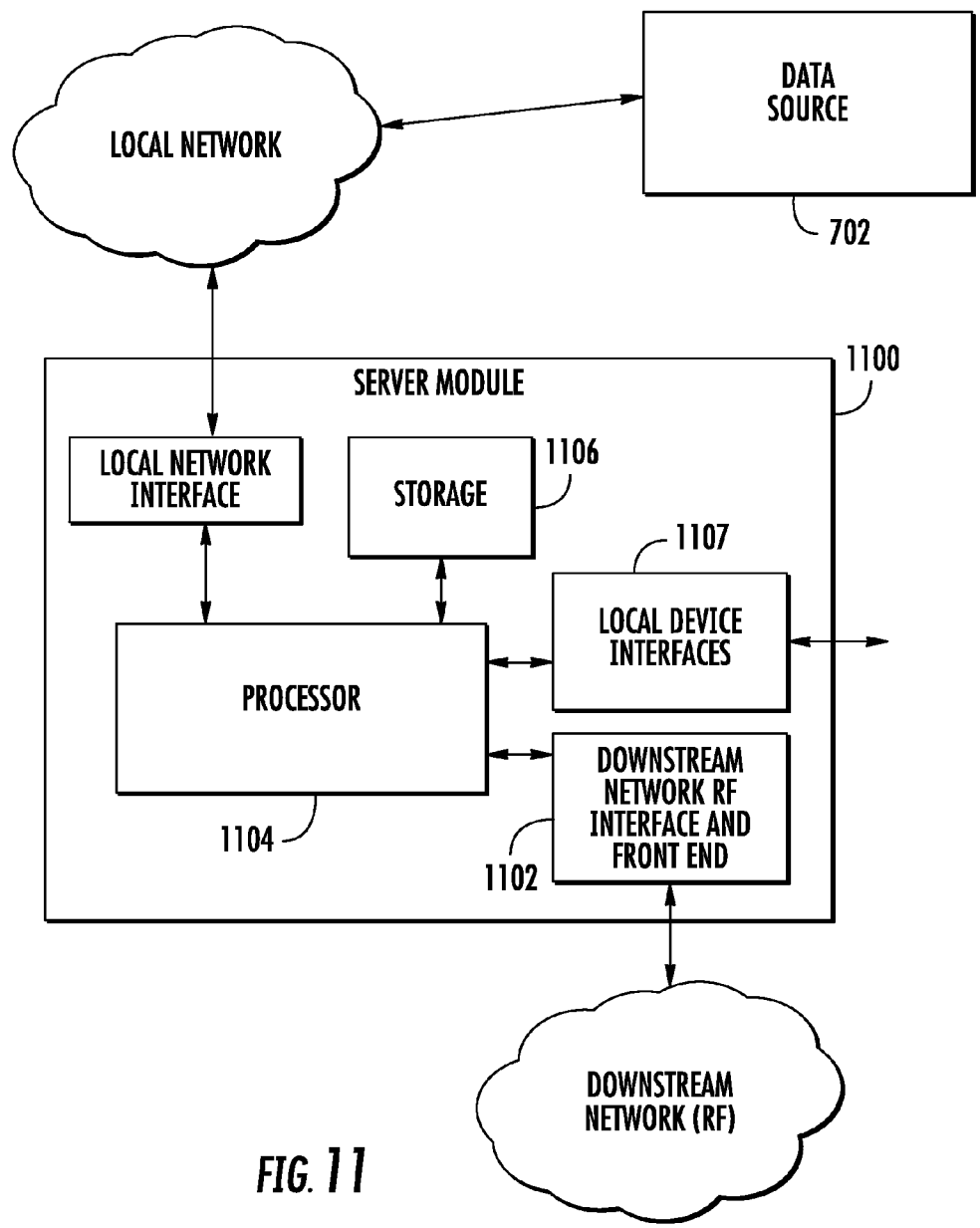
FIG. 11 is a functional block diagram illustrating a first exemplary embodiment of network server apparatus adapted for use in a cable network and implementing the bandwidth allocation methodologies of the present invention.

Referring now to FIG. 11, a first embodiment of the improved network electronic device with bandwidth allocation capability according to the present invention is described. As shown in FIG. 11, the device 705 generally comprises and OpenCable-compliant network server module having an RF front end 1102 (including modulator/demodulator) for interface with the HFC network 701 of FIG. 7, digital processor(s) 1104, storage device 1106, and a plurality of interfaces 1107 for use with other network apparatus such as IP routers and other packet network devices, network management and provisioning systems, local PCs, etc. Other components which may be utilized within the server device 705 include RF tuner stages, amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required. A VOD application is also disposed to run on the server module 705 to provide a functional interface for VOD session requests received from network users or other interposed entities. These additional components and functionalities are well known to those of ordinary skill in the cable and embedded system fields, and accordingly not described further herein.

The server device 750 of FIG. 11 may take any number of physical forms, comprising for example one of a plurality of discrete modules or cards within a larger network edge device of the type well known in the art, or even the cable modem termination system (CMTS). The server may also comprise firmware, either alone or in combination with other hardware/software components such as those previously described (e.g., disposed in the aforementioned edge device). Alternatively, the server module 750 may be a stand-alone device disposed at the head end or other location. Numerous other configurations may be used. The server device 705 may also be integrated with other types of components (such as satellite transceivers, encoders/decoders, etc.) and form factors if desired.

Figure 11A:
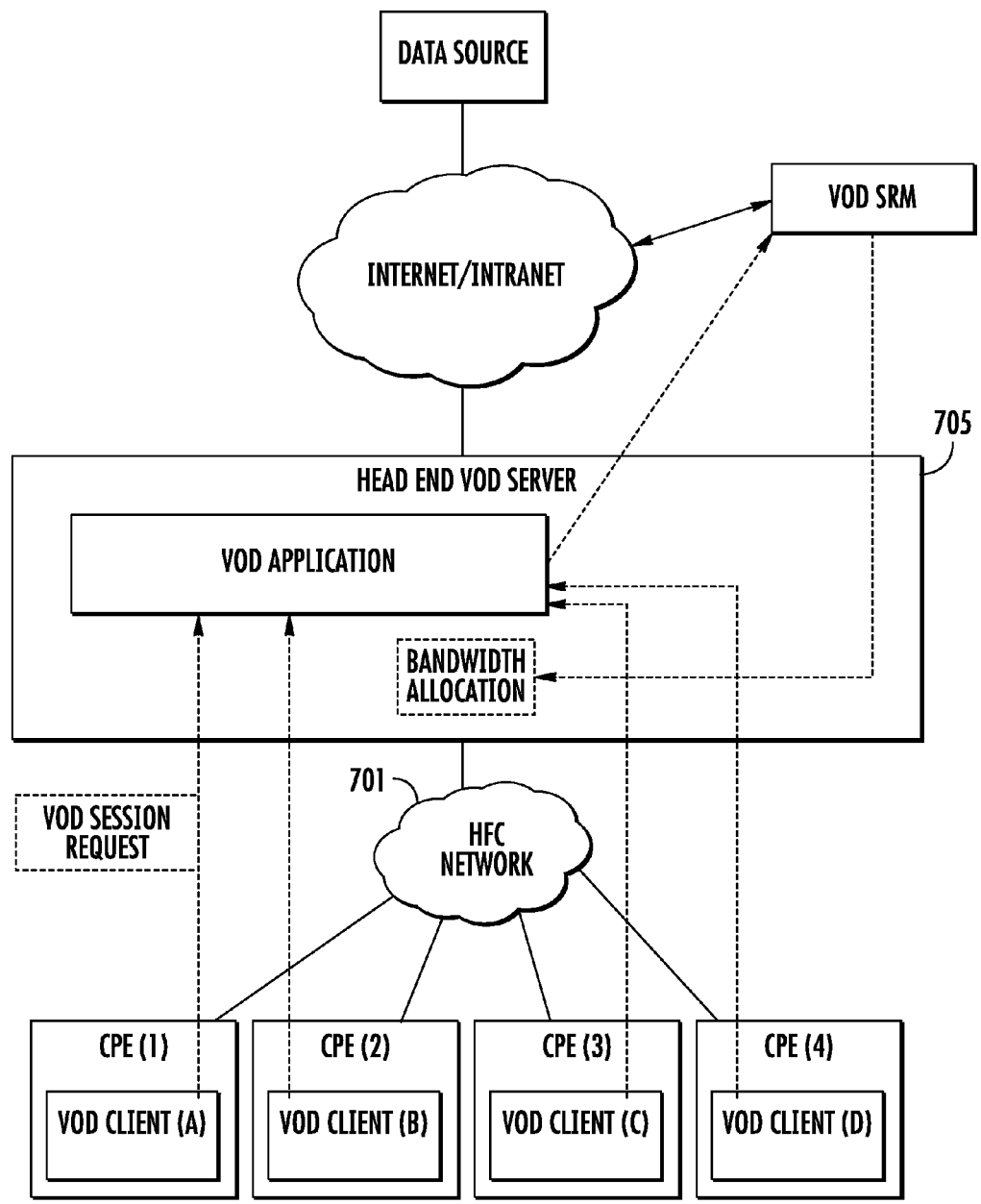
FIGS. 11a and 11b are logical block diagrams illustrating first and second exemplary software architectures which may be used consistent with the present invention.
Figure 11B:
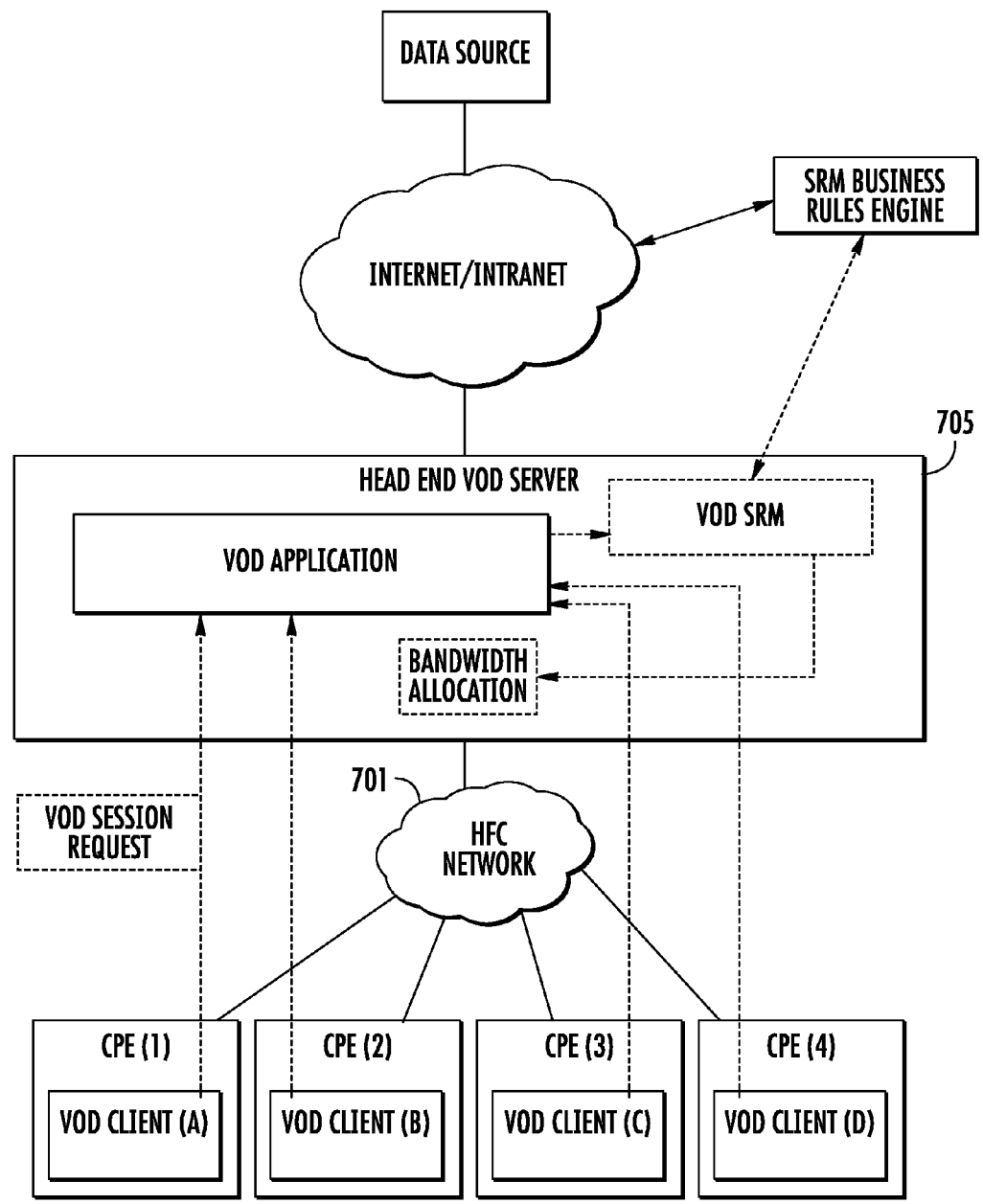

It can also be appreciated that the methods of the present invention may be practiced using any configuration or combination of hardware, firmware, or software, and may be disposed within one or any number of different physical or logical entities. For example, the SRM functionality described above may take the form of one or more computer programs running on a single device disposed within the network (such as the server module 705), such as at a head-end, node, or hub. FIGS. 11a and 11b illustrates two possible software configurations for the server device 705 and associated SRM when used in a cable environment with CPE.

Alternatively, such computer programs may have one or more components distributed across various hardware environments at the same or different locations. As yet another example, portions of the functionality may be rendered as a dedicated or application specific IC having code running thereon. Myriad different configurations for practicing the invention will be recognized by those of ordinary skill in the network arts provided the present disclosure.

In another aspect of the invention, the aforementioned SRM (e.g., rendered as one or more computer programs) includes a so-called "business rules" engine. This engine comprises, in an exemplary embodiment, a series of software routines running on the server device 705 or other associated hardware/firmware environment adapted to control the operation of the SRM allocation algorithms previously described. In effect, the business rules engine comprises a wrapper or controller entity which monitors the OD session requests received by the SRM and dynamically (or manually) controls the operation of the SRM to implement a prescribed set of business rules. For example, one selected business rule may comprise the policy that allocation algorithms within the SRM are weighted or skewed based on profitability or similar considerations, allocating available bandwidth preferentially to higher-profit delivery channels. Consider the simple case of two customers within a service group having different subscription features; e.g., one being enabled to receive HD VOD service which may have a corresponding higher profit margin than the SD-only service obtained by the other customer. Hence, the MSO or service provider may desire to preferentially allocate available bandwidth within the service group to the HD-enabled customer, thereby in effect maximizing the "profit per bandwidth used" equation. This rule can be implemented, for example, through proper manipulation (whether manually by an operator or automatically by the business rules engine) of the variables 1)-7) listed above. For instance, by setting the HD_Session variable higher, the ratio of HD to SD sessions can be increased, thereby in effect preferentially allocating more available bandwidth to HD sessions (and hence the more profitable customers). Such weighting or preference may also be punctuated or overridden by one or more exception rules, such as it is desired to provide normal (non-preferential) allocation during certain times or conditions.

As another exemplary business rule, a given fraction or portion of available bandwidth may be dedicated to a subclass of users (e.g., X number of residential homes subscribing to HD VOD services) within one or more service groups, while the remainder of the bandwidth comprises a free-floating pool of bandwidth allocated according to the optimization algorithm(s) previously described. In this fashion, all or at least a portion of the "premium" customers are guaranteed HD bandwidth, and all remaining customers are allocated in an optimized fashion (which may in fact be driven by one or more secondary business rules that govern operation of the SRMs with respect to the non-dedicated bandwidth).

As referenced above, the business rules engines of the exemplary SRM may also be implemented in a global (i.e., network-wide) fashion. For example, in one variant, available bandwidth within the network is treated in effect as a fungible commodity which can be moved from geographic location to location (within the technological limitations of the existing network architecture) based on business rules such as HD session demand. HD-enabled customers within a given geographic region might be given priority over HD-enabled customers in another region (such as during a regional promotional), thereby causing the local SRMs in the first region to increase their HD-to-SD loading ratios, while decreasing them in the second region. Alternatively, the fraction of "dedicated" bandwidth as described above existing within the first region might be increased, while that in the second region correspondingly adjusted. It will be appreciated that myriad different applications of a global business policy can be envisioned by those of ordinary skill in the art when provided the present disclosure.

Furthermore, as previously discussed, tiers of service groups can be employed, such as where the both standard-definition VOD and high-definition VOD are present. Bandwidth can then be allocated based on the service within a given group if desired.

As yet another option, "logical" allocation schemes may be employed. As used in the present context, the term "logical" may refer to an allocation scheme based on any desired differentiating or descriptive feature, such as (i) actual geography (e.g., New York metro area, the entire Northeast U.S., or the entire continental U.S.); or (ii) on scope (e.g., a "high-level" service group organized around one or more attributes such as service, versus a "low-level" or smaller scope group disposed within the high-level group). As an example of a scope-based allocation scheme, consider the exemplary high-level service group comprising all of those customers of an MSO or service provider that have premium (e.g., HD) service, and an associated low-level group comprising those within the high-level group who primarily utilize their premium service during a given period of the day. This low-level group may relate to another attribute (such as those with per-capita on-demand usage falling above a certain rate). An MSO may decide for example that it prefers to allocate bandwidth preferentially to premium customers (regardless of location), and within that population, to customers who access their premium service during "peak viewing" hours when advertising density may be highest (thereby ostensibly providing the best advertising effect and ultimately increasing advertising revenue in that time period).

Alternatively, these rules may be applied at the lower levels; i.e., by geographically or otherwise restricting application of the rules, such that the foregoing rules apply only to those customers within a given geographic region. This approach gives local operating entities some degree of control over their individual revenue/service equations.

As yet another option, preferential allocation across so-called "global" versus "local" groups can occur. For example, four (4) existing QAM channels in a local (unique) group of channels can be allocated to incoming session request first, followed by allocation of another number (e.g., 2) of global or non-unique channels. This approach may also be limited by exhaustion or not; e.g., the allocation of the global channels may have as a condition precedent that the available channels of the local group are completely exhausted first.

It will also be appreciated that advertising or other comparable services can be considered a "service" which can act as the basis for allocation. As noted above, bandwidth can be allocated to those users, sessions, etc. which will make best use of the bandwidth in terms of advertising return. However, the advertising itself can be used as a basis or parameter on which bandwidth is directly allocated, such as where it is desired to support a minimum level of advertising first before then allocating bandwidth to sessions. Stated differently, an MSO or other entity may actually set aside or delay session requests in favor of advertising-related bandwidth. Similarly, the MSO may desire to have a certain minimum level or quota of gaming or other content. These allocation schemes can also be overlaid onto others; such as for example where the minimum quota for advertising or gaming content is preferentially allocated to global service groups first, whereas other session requests are allocated to the local service groups first. Many other approaches and combinations are envisaged consistent with the invention.

It will also be recognized that the methods and apparatus of the present invention can be used for managing the bandwidth within one or more DOCSIS downstream channels for delivery of IPTV (Internet Protocol television) broadcast and SD/HD VOD. For example, in one configuration, the bandwidth allocation and management techniques may be applied within one or more 6 MHz narrowcast DOCSIS RF Channels, or alternatively within a DOCSIS Broadband set of RF Channels for the delivery of IPTV.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Network apparatus configured to selectively allocate bandwidth within a plurality of radio frequency (RF) channels configured to exist on a network, said RF channels comprising one or more service groups, said apparatus comprising:

a processor;

a storage device in operative communication with said processor;

a plurality of units configured to selectively modulate data onto said RF channels; and a session manager program configured to run on said processor and to receive a plurality of on-demand (OD) session requests from other entities connected to said network, said plurality of requests comprising a first plurality of requests for high definition (HD) data, and a second plurality of requests for standard definition (SD) data, said session manager further being configured to:

identify each request as being one of said first or second plurality;

limit a number of HD sessions currently in process on said channels via a failure to service requests for HD sessions in excess of a predetermined HD session limit;

limit a number of SD sessions currently in process on said channels via a failure to service requests for SD sessions in excess of a predetermined SD session limit; and for said HD and SD sessions which do not exceed said respective HD and SD session limits:

compare an HD bandwidth utilized by at least one of said channels against a predetermined bandwidth threshold for HD sessions;

when said HD bandwidth is less than said predetermined bandwidth threshold for HD sessions, allocate said request via said at least one of said channels in accordance with a Least-Loaded algorithm; and when said HD bandwidth exceeds said predetermined bandwidth threshold for HD sessions, allocate said request via said at least one of said channels in accordance with a Most-Loaded algorithm.

2. A method of allocating channel bandwidth between standard definition (SD) and high definition (HD) sessions in a content distribution network configured for on-demand (OD) content delivery, said channel bandwidth comprising a plurality of substantially similar channels formed within a service group, said method comprising:

receiving a plurality of OD session requests from other entities connected to said network, said plurality of requests comprising a first plurality of requests for HD data, and a second plurality of requests for SD data;

evaluating existing bandwidth allocation on said channels of said service group in relation to a first predetermined allocation variable, said variable comprising information relating to a maximum number of SD session permitted and a maximum number of HD sessions permitted for that service group; and when said evaluation indicates said maximum number of SD and said maximum number of HD sessions are not violated, identifying one or more of said channels as having a lowest amount of used bandwidth, allocating at least a portion of said requests to one or more of said identified channels based at least in part on a pre-determined threshold, when said existing bandwidth exceeds said threshold, identifying a second one or more of said channels as having a highest amount of used bandwidth yet being able to accommodate said portion of said requests, and allocating at least said portion of said requests to one or more of said identified channels;

wherein said act of allocating comprises assigning bandwidth such that maximum opportunity is given to grant HD OD requests among SD OD requests.

3. The method of claim 2, further comprising providing a service manager configured to:

minimize service disruption by spreading said sessions associated with said requests over multiple quadrature amplitude modulated (QAM) channels; and limit a maximum number of active OD sessions associated with both said SD and HD sessions.

4. The method of claim 3, wherein said act of spreading said sessions associated with said requests over multiple QAM channels comprises assigning bandwidth so as to spread said sessions associated with at least said SD requests over multiple QAM channels while simultaneously minimizing stranded or unused bandwidth within said QAM channels so as to minimize an impact of QAM failures on said sessions.

5. The method of claim 2, further comprising predicting an estimated average hold time of an OD session request based at least in part on a length of content requested.

6. The method of claim 2, further comprising predicting an estimated average hold time of a OD session request based at least in part on whether said OD session request comprises an HD session or SD session.

7. The method of claim 2, further comprising predicting whether a next session request is an HD session request or an SD session request based at least in part on HD digital set top box penetration rates, demographics, and content availability.

8. The network apparatus of claim 1, wherein said session manager is further configured to predict an estimated average hold time of a session request based at least in part on a length of content requested.

9. The network apparatus of claim 1, wherein said session manager is further configured to predict an estimated average hold time of a session request based at least in part on an average of a prior moving time period.

10. A computer-readable storage apparatus comprising a non-transitory storage medium with at least one program stored thereon, said at least one program comprising a plurality of instructions which are configured to, when executed, cause a network apparatus connected to a network to:

receive a plurality of on-demand (OD) session requests from other entities connected to said network, said plurality of requests comprising a first plurality of requests for high definition (HD) data, and a second plurality of requests for standard definition (SD) data;

identify each request as being one of said first or second plurality;

limit a number of HD sessions currently in process on said channels by via a failure to service requests for HD sessions in excess of a predetermined HD session limit;

limit a number of SD sessions currently in process on said channels by via a failure to service requests for SD sessions in excess of a predetermined SD session limit; and for said HD and SD sessions which do not exceed said respective HD and SD session limits:

compare a HD bandwidth utilized by at least one of said channels against a predetermined bandwidth threshold for HD sessions;

when said HD bandwidth is less than said predetermined bandwidth threshold for HD sessions, allocate said request via said at least one of said channels in accordance with a Least-Loaded algorithm; and when said HD bandwidth exceeds said predetermined bandwidth threshold for HD sessions, allocate said request via said at least one of said channels in accordance with a Most-Loaded algorithm.

11. The computer-readable storage apparatus of claim 10, wherein said plurality of instructions are further configured to, when executed, predict an estimated average hold time of a session request based at least in part on a length of content requested.

12. The computer-readable storage apparatus of claim 10, wherein said plurality of instructions are further configured to, when executed, predict an estimated average hold time of a session request based at least in part on an average of a prior moving time period.

13. The computer-readable storage apparatus of claim 10, wherein said plurality of instructions are further configured to, when executed:

minimize service disruption via an allocation of said HD and SD sessions associated with said plurality of requests over multiple quadrature amplitude modulated (QAM) channels; and limit a maximum number of active OD sessions associated with both said SD and HD sessions.

14. The computer-readable storage apparatus of claim 13, wherein said HD and SD sessions associated with said plurality of requests are spread over multiple QAM channels via an assignment of bandwidth so as to spread said sessions associated with at least said SD requests over multiple QAM channels, and a simultaneously minimization of stranded or unused bandwidth within said QAM as to minimize an impact of QAM failures on said sessions.

15. The computer-readable storage apparatus of claim 10, wherein said plurality of instructions are further configured to, when executed, when it is determined that said allocation shall not be performed, send a notification message to a device associated with said request.

16. The computer-readable storage apparatus of claim 10, wherein said Least-Loaded algorithm comprises a grant of bandwidth on a channel with a most unallocated bandwidth available, and said Most-Loaded algorithm comprises a grant of bandwidth on a channel that has a least unallocated bandwidth available yet still able to accommodate said request.

* * * * *